(12) United States Patent
Heilper et al.

(10) Patent No.: US 6,438,265 B1
(45) Date of Patent: Aug. 20, 2002

(54) METHOD OF BINARIZATION IN AN OPTICAL CHARACTER RECOGNITION SYSTEM

(75) Inventors: Andrei Heilper, Haifa; Yaakov Navon, Bin Vered; Eugene Walach, Haifa, all of (IL)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/310,287

(22) Filed: May 12, 1999

(30) Foreign Application Priority Data

May 28, 1998 (EP) .............................. 98480038

(51) Int. Cl.$^7$ .............................. G06K 9/00; G06K 9/66; G06K 9/46; G06K 9/56
(52) U.S. Cl. ..................... 382/172; 382/194; 382/195; 382/202; 382/205
(58) Field of Search ............................... 382/190, 194, 382/195, 205, 270, 172, 176; 358/462, 466, 458, 459

(56) References Cited

U.S. PATENT DOCUMENTS

| | | | | |
|---|---|---|---|---|
| 5,058,182 A | * | 10/1991 | Kuan et al. | 382/202 |
| 5,379,130 A | * | 1/1995 | Wang et al. | 358/462 |
| 5,583,659 A | * | 12/1996 | Lee et al. | 358/455 |
| 5,649,025 A | * | 7/1997 | Revankar | 382/171 |
| 5,754,695 A | * | 5/1998 | Kuo et al. | 382/228 |
| 5,889,885 A | * | 3/1999 | Moed et al. | 382/172 |

FOREIGN PATENT DOCUMENTS

| | | | | |
|---|---|---|---|---|
| EP | WO 87/03118 | 5/1987 | | G06K/9/38 |
| JP | 62-152093 | 7/1987 | | G06K/9/38 |
| JP | 2-277186 | 11/1990 | | G06K/9/38 |
| JP | 4-362791 | 12/1992 | | G06F/15/64 |
| JP | 8/172532 | 2/1996 | | H04N/1/403 |
| JP | 62-267887 | 11/1998 | | G06K/9/38 |

OTHER PUBLICATIONS

Kamel et al, Binary Character/Graphic Image Extraction: A New Technique and Six Evaluation Aspects; IEEE Paper ISBN: 0–8186–2920–7, pp. 113–116, Sep. 1992.*

M. Kamel & A. Zhao, "Extraction of Binary Character/Graphic Images from Grayscale Document Images", May 1993 vol. 55, No. 3 pp. 203–217.

\* cited by examiner

*Primary Examiner*—Amelia M. Au
*Assistant Examiner*—Mehrdad Dastouri
(74) *Attorney, Agent, or Firm*—Paul J. Otterstedt; James B. Murray

(57) ABSTRACT

A method of binarization used in an OCR system involves in determining text pixels by checking, for each pixel, that the difference between its value and the values of a plurality of pixels located at a predetermined distance therefrom is greater than a relative threshold corresponding to the difference in intensities between the text and the background of the image, subsampling the image at a rate corresponding to at least two pixels in order to detect kernels of text, and then binarizing the image pixels only in tiles of several stroke width sides containing text kernels by using in each tile, an absolute threshold estimated in that tile. The determining of text pixels includes, for each analyzed pixel, checking that either one of the differences between the value of the analyzed pixel and the value of the two pixels located at each intersection of a circle with each one of the row line, column line and both lines at the angle of 45 degrees, is greater than the relative threshold where that circle is centered at the location of the analyzed pixel and has a radius equal to the stroke width.

18 Claims, 5 Drawing Sheets

METHOD OF BINARIZATION IN AN OPTICAL CHARACTER RECOGNITION SYSTEM

TECHNICAL FIELD

The present invention relates to the Optical Character Recognition (OCR) systems and in particular a new method of binarization in such an optical character recognition system.

BACKGROUND

Binarization of scanned gray scale images which is the first step used in a document image analysis system such as an optical character recognition system. This method consists in labeling each pixel as text or background.

In automatic parcel sorting systems, the address is read and decoded from gray scale image. The image is captured by a camera located above the parcel, while it travels on a conveyor. For obvious reasons, the system is located in an open space building and functions under hard conditions. The gray scale images suffer from unstable light conditions, distortions due to inclination and pixel smearing, poor contrast, and varying resolution due to the changes of the parcel height. Moreover, parcels are covered with plastics which cause reflections, tapes which truncate the address label, logos, textures and graphics. All these variables make the binarization process in sorting system very complicated. The choice of the "best" binarized method is very difficult. A binarization method of several steps is required in order to treat this large range of images.

An evaluation of the different methods of binarization (see the article "Goal-directed evaluation of binarization methods" by 0. Trier et al published in IEEE Transactions on pattern analysis and machine intelligence, vol 17, No. 12, December 1995) has shown that the Niblack method with a postprocessing step appears to be the best one. However, in this method, the threshold estimated is an absolute threshold above which the pixel is set to text and the rest is set to background. The width of the text stroke is not considered in such an estimation and conversely, the background pixels contribute to the estimation, which results in an inaccurate threshold.

SUMMARY OF THE INVENTION

Accordingly, the main object of the invention is to achieve a method of binarization in an OCR system, which uses an estimation of the relative threshold between the intensity of the text and the background based upon only the pixels of the text.

The invention relates therefore to a method of binarization. In an optical character recognition system wherein a scanned gray scale image contains text to be recognized in the form of strokes having a known stroke width corresponding to several image pixels, such a method consists in determining text pixels by checking, for each pixel, that the difference between its value and the values of a plurality of pixels located at a predetermined distance therefrom is greater than a relative threshold corresponding to the difference in intensities between the text and the background of the image, subsampling the image at a rate corresponding to at least two pixels in order to detect kernels of text, and binarizing the image pixels only in tiles of several stroke width sides containing text kernels by using in each tile, an absolute threshold estimated in this tile.

According to a feature of the invention, the step of determining text pixels consists, for each analyzed pixel, in checking that either one of the differences between the value of the analyzed pixel and the value of the two pixels located at each intersection of a circle centered at the location of the analyzed pixel and having a radius equal to the stroke width with each one of the row line, column line and both lines at the angle of 45 degrees, is greater than the relative threshold.

According to a preferred embodiment of the invention, the relative threshold is the threshold corresponding to the tail of the dominant lobe of the histogram giving the number of tiles having side of a predetermined size, preferably equal to the stroke width, and which are fully filled with pixels determined as text pixels in function of a threshold value which is the minimal difference between the value of the analyzed pixel and the values of the two neighboring pixels located at the intersection of the circle and one of the lines for which the conditions to set a pixel to "text" are fulfilled.

BRIEF DESCRIPTION OF THE DRAWINGS

The objects, characteristics and advantages of the invention will become clear from the following description given in reference to the accompanying drawings wherein.

DETAILED DESCRIPTION OF THE INVENTION

The method of binarization according to the invention is composed of the following steps:
search of text kernels
noise removal
tiles binarization of the text kernel areas

Search of Text Kernels

In a gray scale image, the text is characterized by two principal parameters : the stroke width which corresponds approximately to the pen width and sharp changes of the intensities at the text edges defining a relative threshold. These two parameters change from image to image and are first estimated from the gray scale image.

The estimation of the stroke width is based on the analysis of row profile in the gray scale image. Normally, the text in the gray scale image has low intensity values relative to the background. Along a row, which contains text, there are sharp gradients in pixel intensity, at the vicinity of text. Those gradients form "holes" in the pixels intensity row profile. The widths of "holes" are estimated across several rows in the image, and the average of the widths is the stroke width.

The stroke width computed with this procedure is accurate, but this accuracy is not crucial to the binarization results. The stroke width is required only for search of text kernels. In the worst case, its accuracy may be greater than the exact stroke width by a factor of √2, in case of text rotated by 45 degrees. As described in the following description the search is carried out in several directions, and in the neighborhood of a space corresponding to two stroke widths. Therefore, the importance of the width inaccuracy is negligible.

The relative threshold which is an essential feature of the invention represents the difference in the intensities between text and background. This relative threshold varies from zone to zone. In a poor contrast area, the threshold is low, and in a high contrast area, the threshold is higher. The principle of the invention is to consider a pixel as text if its intensity is lower than the intensities of some of the pixels in its neighborhood.

First, the image is divided into square tiles the size of which has a size of a stroke width, that is a size equal to four pixels in the preferred embodiment.

Figure 1:
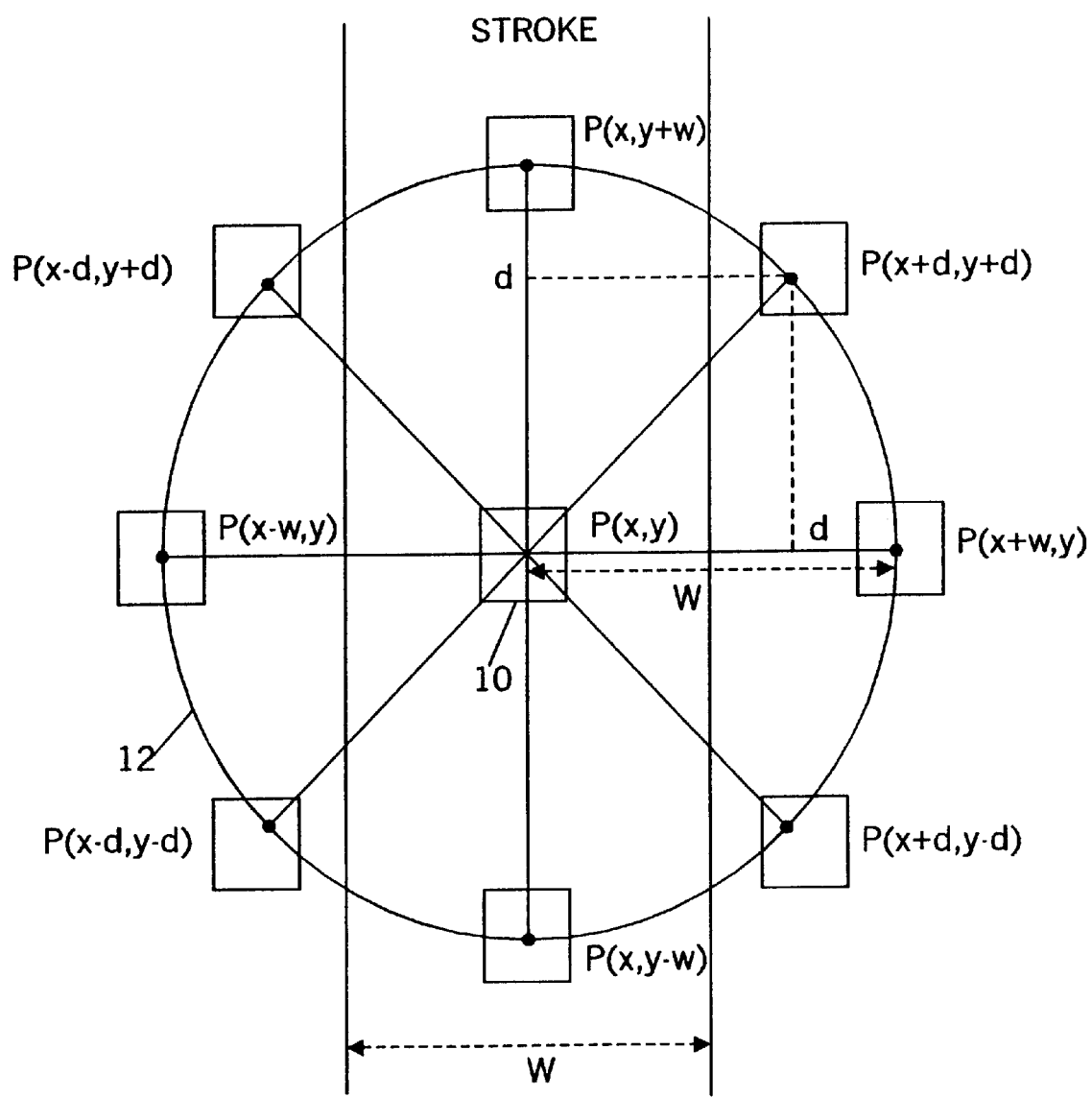
FIG. 1 is a diagram representing a pixel to be analyzed and its eight neighbors located at the intersection of a circle having a radius equal to the stroke width with the row line, the column line and the lines at an angle of 45° with respect to the row line, to be used for computing the relative threshold used in the method according to the invention.

As illustrated in FIG. 1, the pixel 10 to be analyzed is checked against its neighbors which are located on a circle 12, the radius of which is equal to the stroke width and centered at the analyzed pixel 10. These neighbors are at the intersection of circle 12 and four lines, the row line, the column line and the two lines which are at an angle of 45% with respect to the row line. For each line, the value of the center pixel is compared to the values of the two other pixels in order to check whether these three pixels form an "intensity hole" deeper than the relative threshold. If so, the center pixel is set to "text".

To formalize the process above, it can be assumed that with a stroke width w and a relative threshold t and if P (x, y) denotes the pixel value at location (x, y), this pixel is set to "text" if the following condition occurs:

$$P(x-w,y)-P(x,y)>t \text{ AND } P(x+w,y)-P(x,y)>t$$

OR $$P(x,y-w)-P(x,y)>t \text{ AND } P(x,y+w)-P(x,y)>t$$

OR $$P(x+d, y+d)-P(x,y)>t \text{ AND } P(x-d, y-d)-P(x,y)>t$$

OR $$P(x-d, y+d)-P(x,y)>t \text{ AND } P(x+d, y-d)-P(x,y)>t$$

where the coordinates (x+/−d, y+/−d), are the coordinates on the circle for the lines at 45 and 135 degrees and d is equal to w/√2.

Figure 2:
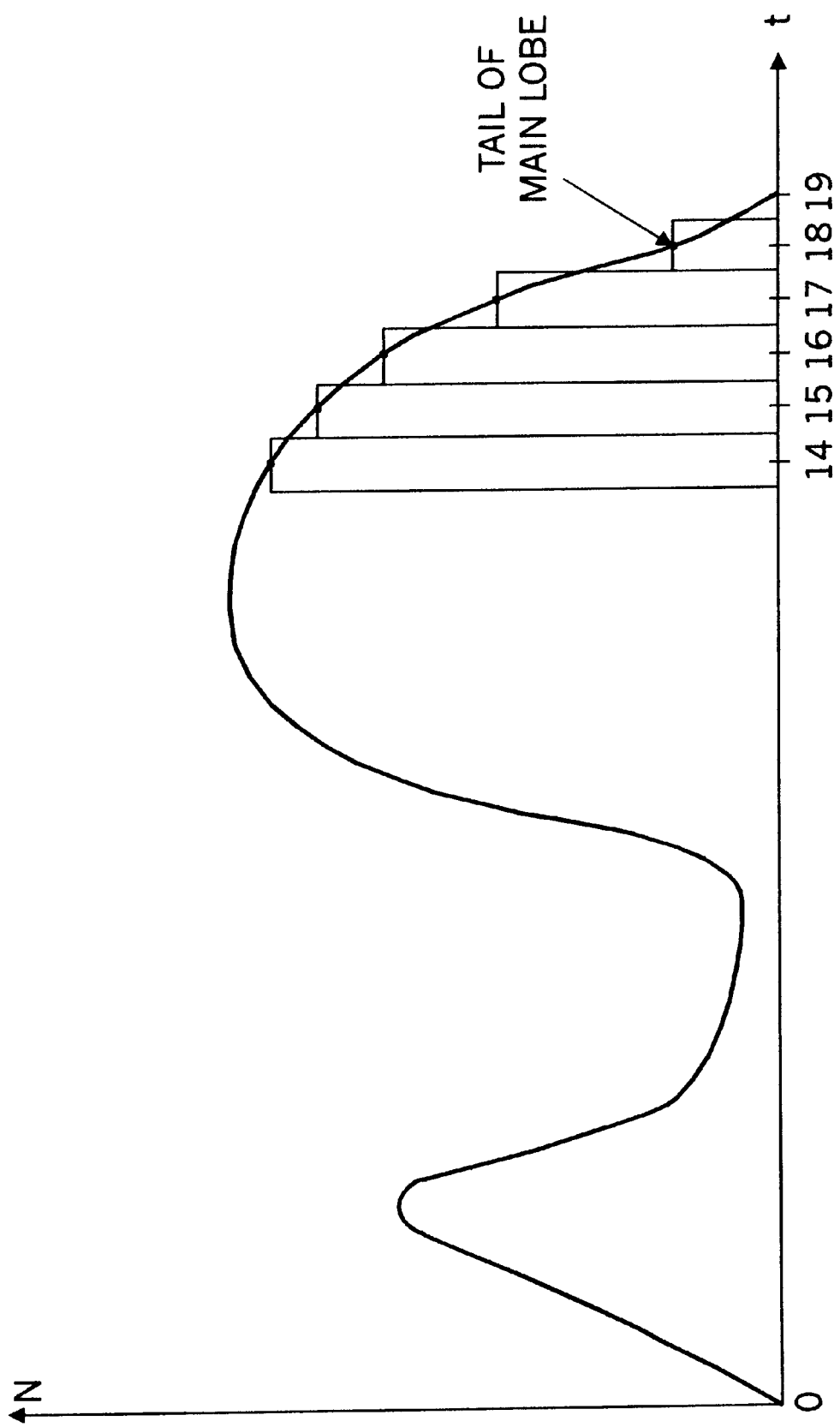
FIG. 2 is a diagram representing the histogram of the fully filled tiles in function of the estimated relative threshold.

The above search is performed over a set of threshold values t. For a threshold t, the tiles wherein all the pixels were set to "text" are determined. For such a tile, a t-min is determined. t-min is the minimal difference between the analyzed pixel value and the values of its two neighboring pixels in one of the lines amongst the lines defined hereabove for which the conditions to set a pixel to "text" are fulfilled, that is for which the three pixels form an "intensity hole". This minimal value is used as the abscissa on the histogram to define the value of fulled filled tiles N(t-min). Such an histogram can have several lobes as illustrated in FIG. 2.

The estimated relative threshold is chosen as the tail of the dominant lobe of the histogram built up with the above procedure. Thus, in the histogram of FIG. 2, the selected relative threshold is t=18 corresponding to the value of t before t=19 where N=0. It is preferable to select the highest threshold (although a lower threshold could have been selected) because such a threshold makes the conditions to set a pixel to "text" more rigid. This will cause to a part of text pixels to be set wrongly to "background" but, in the tiles binarization step as explained hereafter, they will be reset to "text". Furthermore, if a lower threshold is selected, noisy pixels could be set to "text" since such a lower threshold makes the conditions to set a pixel to "text" less rigid. Insofar as the condition to get a tile wherein all pixels were set to "text" is very hard, it can be assumed that more tiles with only part of the pixels were set to "text" are found. So, this process will not miss too many pixels which are text pixels, and the subsequent tiles binarization will reset these pixels which were missed.

The search of the text kernels is a pre-binarization step, where only part of the text pixels are set. A pixel is set to "text", if the condition defined in the previous section occurs. The t and w are now the estimated relative threshold and the estimated stroke width, respectively.

Figure 3:
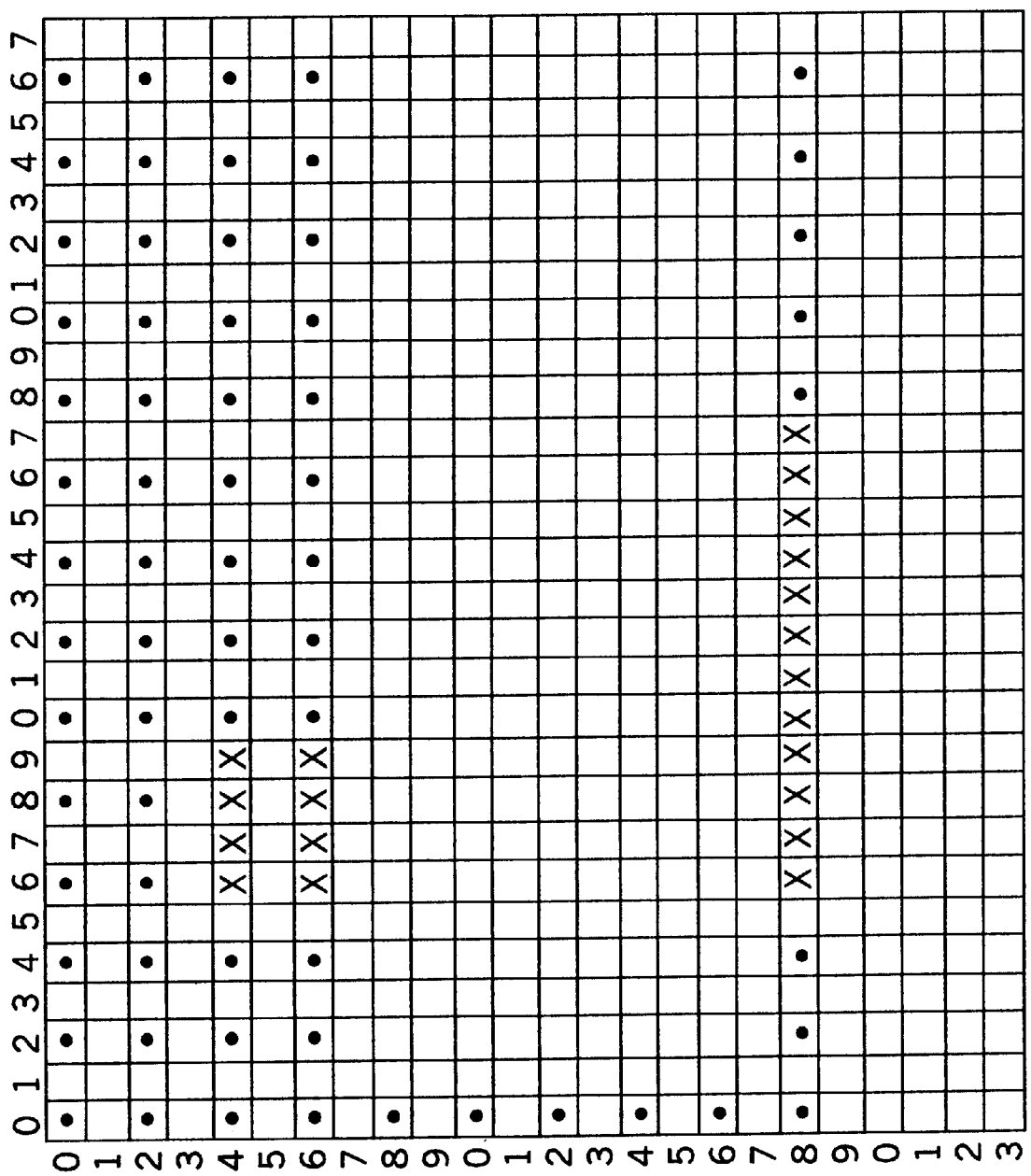
FIG. 3 represents schematically an image including the letter L which is the text kernel to be identified, the background being representing by dot pixels and text being represented by x pixels.

At this pre-binarization step, the search is made either on a subsampled image space or on the original image space pixel by pixel. Assuming that the image contains a L character having a stroke width of four pixels as illustrated in FIG. 3. With a subsampling rate of 2, the subsample image space is scanned while analyzing each time by 2 within each row and then incrementing by 2 for analyzing the next row as represented by dots in row 0 and row 2 in FIG. 3. The checked pattern is therefore the following:

row 0: $p(0,0), p(0,2), p(0,4), p(0,6) \ldots p(0,26)$ row 2: $p(2,0), p(2,2), p(2,4), p(2,6) \ldots p(2,26)$ row 4: $p(4,0), p(4,2), p(4,4), p(4,6)$ Pixel p(4,6) being set to "text", the process switches to the original image space, i.e. every pixel is now checked, with the increment being 1.

Each pixel being checked is now represented by an "x". The pixels which are checked as being text pixels are in row 4: p(4,6), p(4,7), p(4,8), p(4,9). But pixel p(4,10) being a background pixel, the process is switched back to the subsampled image space, i.e incrementing by 2:

row 4: $p(4,10), p(4,12) \ldots p(4,26)$ row 6: $p(6,0, p(6,2), p(6,4), p(6,6)$

Pixel p(6,6) being set to "text", the process is again switched to the original image space (incrementation by 1) until p(6,10) and then switched back to the subsample space. And so on.

Since most of the pixels in an image are background pixels, this search is time consuming. It is why the increment of sampling is changed from 1 to 2 (or more) when a pixel is found to be a background pixel. Only when a pixel is set to "text", it is reasonable to check every pixel.

Ideally, the result of this step is a binary image which contains kernels of text and lines, of width equal to the estimated stroke width. "Flat" light and dark regions are expected not to appear in the binary image, e.g. large tapes glued on parcel. Edges between light and dark regions, like white label on a dark parcel are not supposed to appear in the binary image. The reason for that is exemplified for a pixel on the edge of a black tape and two of its neighbors on the same row. This pixel intensity P(x,y) is equal or lower than only one of its neighbor values: P(x−w, y) and P(x+w, y). If one of them is located on the tape, the other one is located on the background, and vice versa. The condition to set this pixel to black, as stated in the preceding step would be never satisfied.

Noise Removal

Practically, images are not captured in ideal conditions, as mentioned before. The images suffer from illumination gradients, textured background, noises, etc. Hence, the pre-binarized image includes noises which have to be removed before proceeding to the next step of the binarization. For this, two sequential steps are applied: removal pixels of high intensity and then removal of isolated pixels.

For removing the pixels of high intensity, the histogram of intensities of the pixels, which were set to text in the previous step, is analyzed. From this analysis, the occurrence of background pixels in the text kernel image can be found. Normally, these pixels have higher intensities than proper text pixels, but were wrongly set to "text". Probably, those pixels are located within "noisy" or textured areas and they fulfill the rule of setting pixel to "text", as described previously. If such pixels are found, they are removed from the text kernel binary image, i.e. reset to "background" pixel. These pixels which were set to text but were found to be isolated from other text pixels, are deemed to be noise. Since the text is characterized by stroke width, it is expected that the text kernel size to be close to it. Such pixels, are reset to "background".

Tiles Binarization of the Text Kernel Areas

At this stage, the majority of pixels in the image which are text are set to "text". Pixels in the vicinity to "text" pixels can be "text" or "background" pixels. Also, some pixels (minority part) which were set to "text" can be "background" pixels. Therefore, a second binarization called "tiles binarization" is carried out. The image space is divided into square tiles, of several square width sides, and only the tiles which contain "text" pixels are re-binarized.

Figure 4:
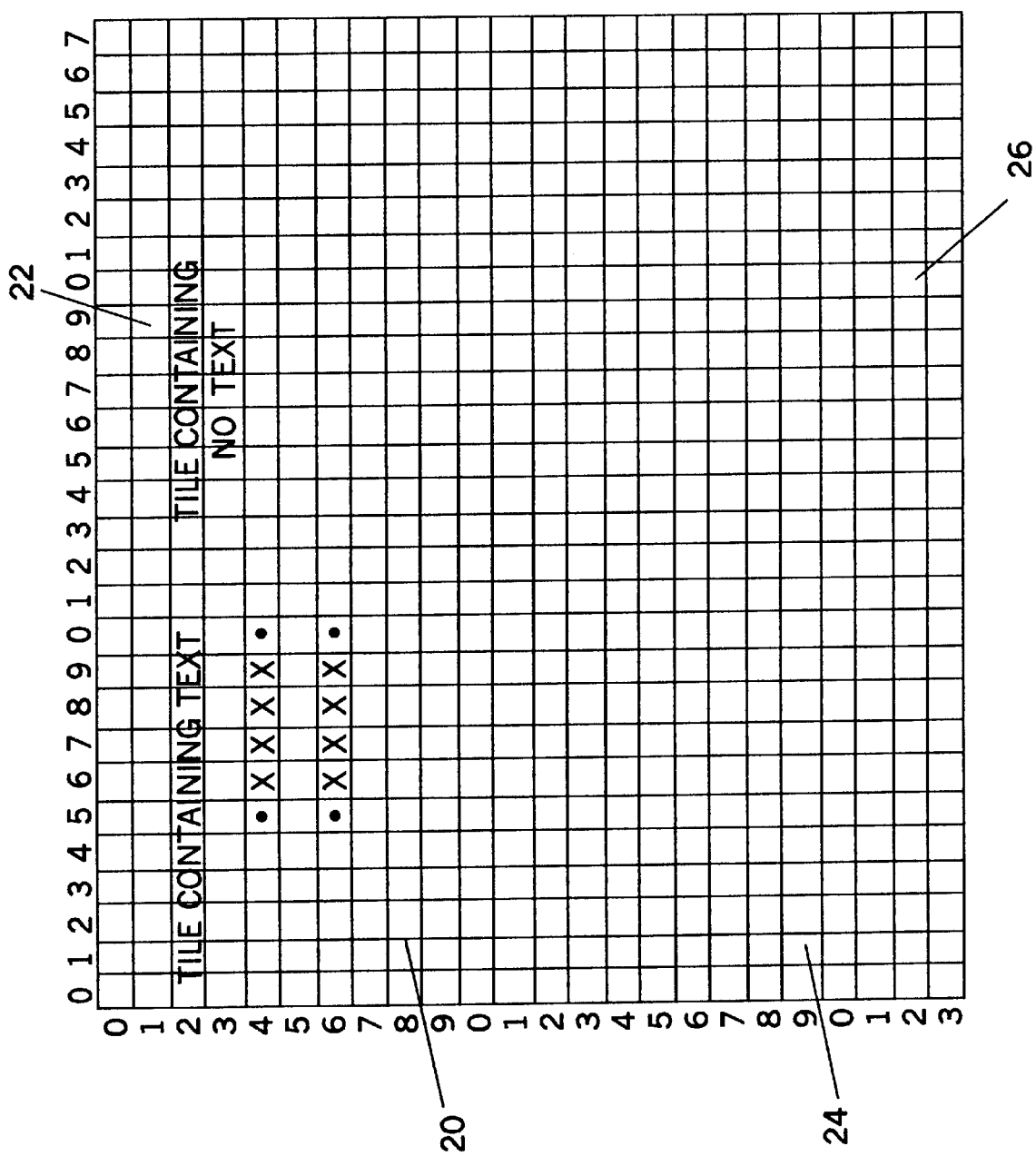
FIG. 4 represents schematically an image including the letter L and being divided into several tiles used for the tiles binarization step.

For example, in FIG. 4, the image space is divided into square tiles of 12×12 pixels corresponding to a side of 3 stroke widths. Thus, tiles 20, 24 and 26 containing text (parts of letter L) are re-binarized whereas tile 22 containing no text is no re-binarized.

A tile to be re-binarized such as tile 20 includes text pixels (such as the pixels defined by an "x" in FIG. 4) and non-text pixels in a neighborhood of a text pixel (such as the pixels defined by a dot). For each tile such as tile 20, an absolute threshold is estimated. The pixels the value of which is below this threshold are set to "text" and otherwise are set to "background".

In a preferred embodiment, the absolute threshold is evaluated from the "texts" pixels, and from "non-text" pixels in the vicinity of the "text" pixels (in neighborhood of 2–3 pixels), within the tile. The threshold is set to the arithmetic average of "text" pixels value average, and of the "non-text" pixels value average.

This binarization "smooths" and fills gaps in the text kernel image, received after the "search of text kernels" step. Pixels which were set to "background" are now reset to "text". On the other hand isolated and noisy, pixels which were wrongly set to "text" are now reset to "background".

Advantages of the Method According to the Invention

There are a lot of methods of binarization. But, contrary to most of them this method is oriented to OCR purposes. Indeed, ideally input image to OCR must be clean and must contain only text. This is crucial for the segmentation step in the OCR process where characters locations are defined prior to the recognition step.

Thus, the advantages of this method are the following:
one essential feature being the estimation of the relative threshold, this one is more accurate since only pixels of text contribute to this estimation.
In dark areas, like strips on a parcel image, the pixels have intensity close to text. In this method, pixels are set to "text" only if they are part of line or text of a given stroke width. Therefore, a dark area will not appear in the binarized image, since its "width" is much more higher that the stroke width. Also, the edges of the dark area will not appear.

For an image which contains text, (for example an address) and a logo composed of graphics and bold text, most parts of the logo will not appear in the binarized image. This is important for the OCR, since treating a "noisy" area by the OCR spends a lot of time and causes a lot of problems. For example, it is very difficult for OCR to segment a text area to text lines when graphics appear in the binarized image.

In images which include text, most of the pixels are "background" pixels. The search of text patterns in this method, requires to check only a small part of the pixels. For example, if a subsampling rate of 2 is used, a little bit more than a quarter of the pixels are checked. In the tiles binarization step, only the tiles which include text are re-binarized, and this also spends a lot of time.

Before the tiles binarization step, there is a step of noise removal during which pixels which wrongly were set to "text" are reset to "background". This makes accurate the estimation of the absolute threshold in the tiles binarization step, improving therefore the binary image quality.

In textured background there are a lot of "isolated" pixels which fulfilled the conditions to be set to "text". Thus, there are a lot of tiles which include "text" that would be rebinarized in the tiles binarization step. Removing such pixels reduces processing time and improves the binary image quality.

Figure 5:
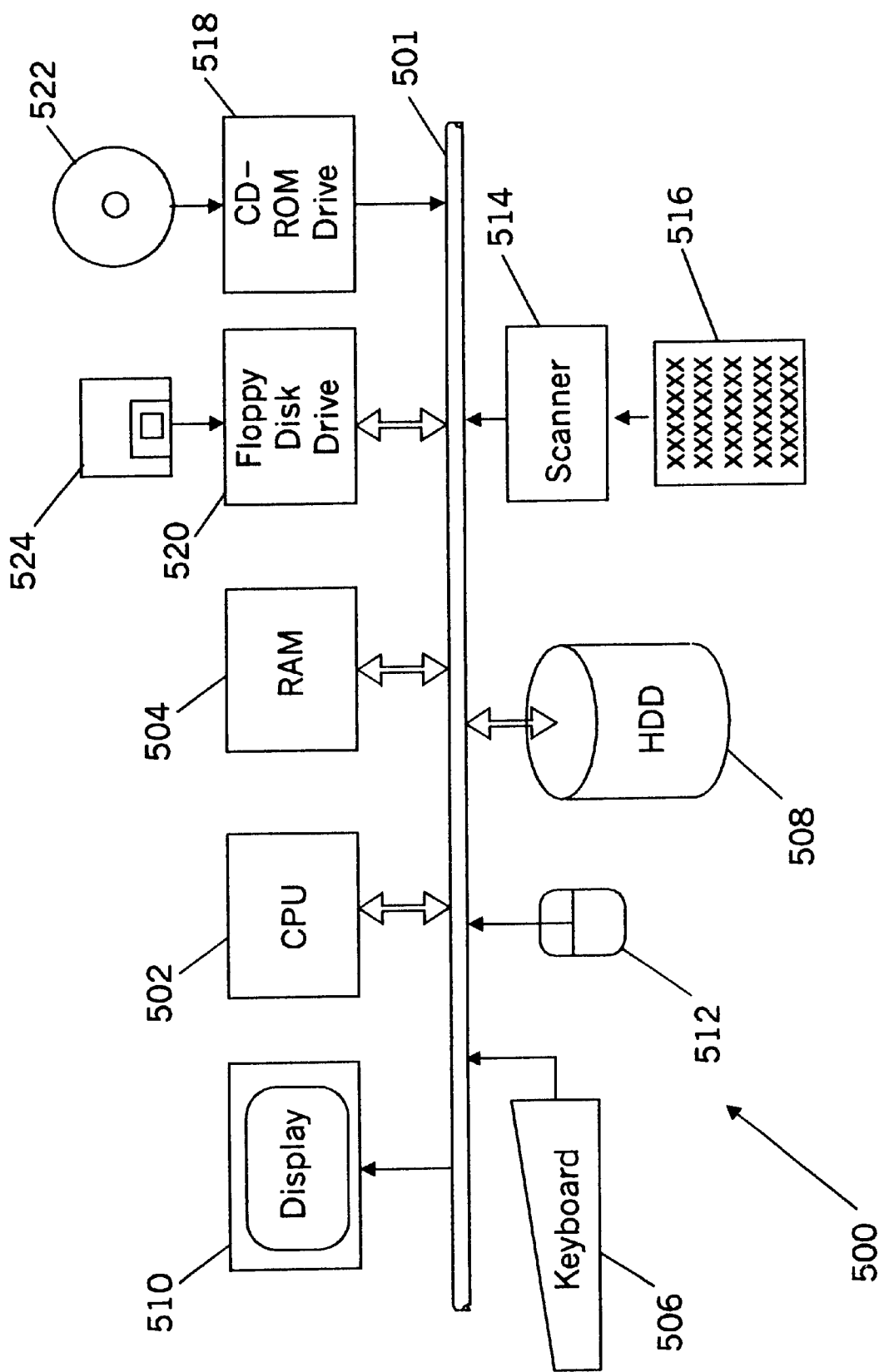
FIG. 5 is a block diagram of a computer system for use with the present invention.

FIG. 5 shows a general purpose computer system 500 for the present invention. The computer system includes a control processing unit 502 connected by a bus 501 to a random access memory 504, a high density storage device 508, a keyboard 506, a display 510 and a mouse 512. Also attached to the CPU 502 by the bus 501, are: a scanner 514 for scanning into the computer 500 documents 516 to be analyzed in accordance with the present invention, and CD-ROM and magnetic disc drives 518 and 520 for entry information from optical and floppy magnetic discs 522 and 524 containing program code and data of the present invention.

While the invention has been described with respect to the illustrated embodiment, it will be understood by those skilled in the art that various changes can be made without departing from the spirit and scope of the invention.

We claim:

1. In an optical character recognition system wherein a scanned gray scale image contains text to be recognized in the form of strokes having a known stroke width corresponding to several image pixels, a method of binarization comprising:

determining text pixels by checking, for each pixel, that the difference between its value and the values of a plurality of pixels located at a predetermined distance therefrom is greater than a relative threshold corresponding to the difference in intensities between the text and the background of the image, where the determining text pixels comprises, for each analyzed pixel, checking that either one of the differences between the value of said analyzed pixel and the value of the two pixels located at each intersection of a circle with each one of the row line, column line and both lines at the angle of 45 degrees with respect to the line row is greater than said relative threshold, which circle is centered at the location of said analyzed pixel and has a radius equal to said stroke width, subsampling the image at a rate corresponding to at least two pixels in order to detect kernels of text, and binarizing the image pixels only in tiles of several stroke width sides containing said text kernels by using in each of said tiles, an absolute threshold estimated in said tile.

2. The method according to claim 1, wherein said relative threshold is the threshold corresponding to the tail of the dominant lobe of the histogram giving the number of tiles having a predetermined size which are fully filled with pixels determined as text pixels in function of a threshold value being the minimal difference between the value of said analyzed pixel and the values of the two neighboring pixels located at the intersection of said circle and any one of said lines for which the condition for said analyzed pixel being set to text are fulfilled.

3. The method according to claim 2, wherein the radius of said circle is equal to said stroke width.

4. The method according to claim 1, wherein the step of subsampling comprises repetitively analyzing the pixels in a row which is scanned with a sampling rate corresponding to at least 2 pixels until an analyzed pixel is determined as being a background pixel.

5. The method according to claim 4, wherein the rows of the image are scanned with the same sampling rate as the sampling rate used for scanning the pixels within each row.

6. The method according to claim 5, wherein said absolute threshold is estimated from the text pixels and the non-text pixels in the vicinity of said text pixels, the estimation being the arithmetic average of the text pixel value average and of the non-text pixel value average.

7. The method according to claim 6, wherein the tiles used in the image binarizing step are square tiles having a side equal to three stroke widths.

8. The method according to claim 1, further comprising the step of removing pixels of high intensity after said step of subsampling and before said step of binarizing, said removing step consisting in changing text pixels of higher intensity than proper text pixels into background pixels.

9. The method according to claim 1, further comprising the step of changing text pixels isolated from the other text pixels into background pixels.

10. A computer program product comprising:

a computer readable medium having computer readable program code embodied therein for a optical character recognition wherein a scanned gray scale image contains text to be recognized in the form of strokes having a known stroke width corresponding to several image pixels said computer program product comprising:

computer readable program code for causing a computer to determine text pixels by checking, for each pixel, that the difference between its value and the values of a plurality of pixels located at a predetermined distance therefrom is greater than a relative threshold corresponding to the difference in intensities between the text and the background of the image, wherein the program code used to determine text pixels comprises, for each analyzed pixel, program code for checking that either one of the differences between the value of said analyzed pixel and the value of the two pixels located at each intersection of a circle with each one of the row line, column line and both lines at the angle of 45 degrees with respect to the line row is greater than said relative threshold, which circle is centered at the location of said analyzed pixel and has a radius equal to said stroke width, computer readable program code for causing a computer to subsample the image at a rate corresponding to at least two pixels in order to detect kernels of text, and computer readable program code for causing a computer to binarize the image pixels only in tiles of several stroke width sides containing said text kernels by using, in each of said tiles, an absolute threshold estimated in said tile.

11. The computer product according to claim 10, wherein said relative threshold is the threshold corresponding to the tail of the dominant lobe of the histogram giving the number of tiles having a predetermined size which are fully filled with pixels determined as text pixels in function of a threshold value being the minimal difference between the value of said analyzed pixel and the values of the two neighboring pixels located at the intersection of said circle and any one of said lines for which the conditions for said analyzed pixel being set to text are fulfilled.

12. The computer product according to claim 11, wherein the radius of said circle is equal to said stroke width.

13. The computer product according to claim 10, wherein the program code used to subsample comprises program code for repetitively analyzing the pixels in a row which is scanned with a sampling rate corresponding to at least 2 pixels until an analyzed pixel is determined as being a text pixel and then analyzing every pixel of the row until a pixel is determined as being a background pixel.

14. The computer product according to claim 13, including program code for scanning the rows of the image with the same sampling rate as the sampling rate used for scanning the pixels within each row.

15. The computer product according to claim 14, including program code for estimating said absolute threshold from the text pixels and the non-text pixels in the vicinity of said text pixels, the estimation being the arithmetic average of the text pixel value average and of the non-pixel value average.

16. The computer product according to claim 15, wherein the tiles used in the image binarizing step are square tiles having a side equal to three stroke widths.

17. The compute product according to claim 16, including program code for removing pixels of high intensity after said step of subsampling and before said step of binarizing, said removing step consisting in changing text pixels of higher intensity than proper text pixels into background pixels.

18. The computer product according to claim 17, including code for changing text pixels isolated from the other text pixels into background pixels.

* * * * *